(12) United States Patent
Zaveri (10) Patent No.: US 8,745,666 B1
(45) Date of Patent: Jun. 3, 2014

(54) PREDICTIVE ANALYTICS FOR MEDIA CONTENT USING SCHEDULED TIMERS AND MEDIA USAGE

(71) Applicant: Eldon Technology Limited, Keighley (GB)

(72) Inventor: Sagar Zaveri, Highlands Ranch, CO (US)

(73) Assignee: Eldon Technology Limited (GB)

( * ) Notice: Subject to any disclaimer, the term of this patent is extended or adjusted under 35 U.S.C. 154(b) by 0 days.

(21) Appl. No.: 13/711,464

(22) Filed: Dec. 11, 2012

(51) Int. Cl.
- *H04N 5/445* (2011.01)
- *G06F 3/00* (2006.01)
- *G06F 13/00* (2006.01)

(52) U.S. Cl.
USPC .............. 725/46; 725/44; 725/47; 725/14

(58) Field of Classification Search
USPC .......................... 725/14, 44, 46, 47
See application file for complete search history.

(56) References Cited

U.S. PATENT DOCUMENTS

| | | | |
|---|---|---|---|
| 2002/0087967 A1* | 7/2002 | Conkwright et al. | 725/1 |
| 2004/0049788 A1* | 3/2004 | Mori et al. | 725/58 |
| 2007/0136753 A1* | 6/2007 | Bovenschulte et al. | 725/46 |
| 2008/0098436 A1* | 4/2008 | White | 725/58 |
| 2008/0216106 A1* | 9/2008 | Maxwell et al. | 725/1 |
| 2010/0088727 A1* | 4/2010 | Jensen | 725/46 |
| 2010/0153173 A1* | 6/2010 | Bi et al. | 705/10 |
| 2010/0299692 A1* | 11/2010 | Rao et al. | 725/14 |
| 2011/0067066 A1* | 3/2011 | Barton et al. | 725/46 |
| 2012/0284753 A1* | 11/2012 | Roberts et al. | 725/45 |
| 2013/0081084 A1* | 3/2013 | Scheer | 725/46 |

* cited by examiner

*Primary Examiner* — Robert Hance (74) *Attorney, Agent, or Firm* — Kilpatrick Townsend & Stockton LLP (57) ABSTRACT

Predicting user-interest in particular media content. Data associated with scheduled program recording timers may be accumulated across accessible subscribing customers of a particular television provider. A ranking parameter may be assigned to particular programs associated with particular ones of the scheduled program recording timers. A list may be presented itemizing particular programs based on assigned ranking values.

19 Claims, 6 Drawing Sheets

PREDICTIVE ANALYTICS FOR MEDIA CONTENT USING SCHEDULED TIMERS AND MEDIA USAGE

BACKGROUND

The ever-increasing amount and diversity of electronic media content may allow consumers the flexibility to access many different types of media content of interest. In such scenarios, however, a trade-off may exist between quantity of available media content, and perceived quality of the same. In particular, it may be difficult for consumers to identify particular media content of interest from a vast amount of available media content.

SUMMARY

This Summary does not in any way limit the scope of the claimed subject matter.

In one aspect, a method for predicting user-interest in particular media content is disclosed. The method may include accumulating data associated with scheduled program recording timers across accessible subscribing customers of a particular television provider. The method may further include assigning a ranking parameter to particular programs associated with particular ones of the scheduled program recording timers. The method may further include outputting a list itemizing particular programs based on assigned ranking values for presentation to at least one user of the particular television provider.

In another aspect, a television receiver is disclosed. The television receiver may include a module configured to receive data associated with scheduled program recording timers across accessible subscribing customers of a particular television provider. The television receiver may further include a module configured to calculate and assign a ranking parameter to particular programs associated with particular ones of the scheduled program recording timers. The television receiver may further include a module configured to generate a list itemizing particular programs based on assigned ranking values. One or more modules of the television receiver may be wholly or at least partially incorporated with one or more other modules of the television receiver.

In yet another aspect, a computing device including a processing unit and system memory connected to the processing unit is disclosed. The system memory may include instructions that, when executed by the processing unit, cause the processing unit to implement an analysis module configured to populate a trend list at least based upon accessible program recording timers that are associated with each of a plurality of networked television receivers connected in a computing system environment. The analysis module may include a module configured to generate an activation trigger in response to at least one of a periodic activation signal and an intermittent activation signal. The analysis module may further include a module configured to store scheduled program recording timers. The analysis module may further include a module configured to send, to a particular computing system in response to receiving a particular activation trigger, information associated with scheduled program recording timers as stored within the second module, and receive, from the particular computing system based on another particular activation trigger, data associated with scheduled program recording timers across accessible subscribing customers of a particular television provider. The analysis module may further include a module configured to assign a ranking parameter to particular programs associated with particular ones of the scheduled program recording timers based upon a number of particular ones of the scheduled program recording timers, and generate the trend list itemizing particular programs based on assigned ranking values. One or more modules of the analysis module may be wholly or at least partially incorporated with one or more other modules of the analysis module.

DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

The present disclosure is directed to systems and methods for predicting user-interest in particular media content based on user-activity that is associated with the particular media content. In general, a sample of data that is associated with a particular media type, along with a particular activity type associated with the particular media type, may be aggregated and compiled. Example types of media may include advertising media, broadcast media, social media, news media, and the like. Example types of activity may include any perceivable user-specific behavior or interaction with particular content that is associated with the particular media type. The aggregated data may be mined to discover any number of particular trends or patterns. The trends or patterns may be quantified and exposed to enable consumers to make more informed choices or decisions.

In one example embodiment described herein, data associated with scheduled program recording timers may be aggregated and compiled across all accessible subscribing customers of a particular television provider. In this example, a particular media type corresponds to broadcast media, and a particular activity type corresponds to setting a recording timer to record particular audio/video content of particular broadcast media programming. Such compiled data may be mined to discover any number of particular trends or patterns. For example, analytics may be applied against the compiled data to estimate how many of the subscribing customers may or might potentially access a particular program, based on numbers of scheduled program recording timers that are associated with the particular program. In this example, a rank or ranking parameter may be assigned to all identified programs, associated with each of the scheduled program recording timers, to inform subscribing customers (and other consumers) which programs are most likely to be watched in the future. Such an implementation may be beneficial in many respects. For example, discovering and surfacing trends or patterns based at least on "future" information (i.e., scheduled recording timers) may enable subscribing customers to keep up with latest trends as they are currently developing. Although not so limited, an appreciation of the various aspects of the present disclosure will be gained through a discussion of the example(s) provided below.

Figure 1:
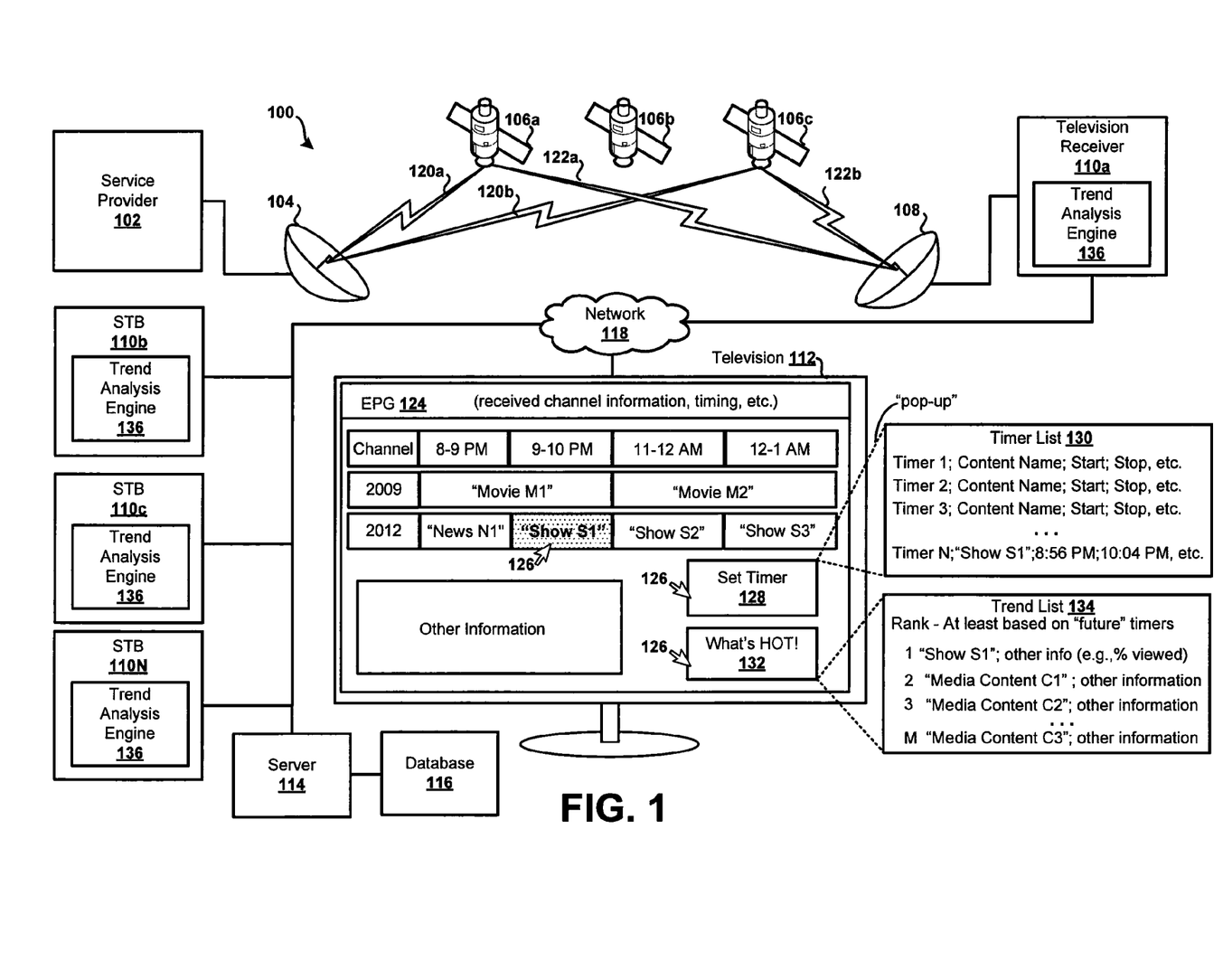
FIG. 1 shows an example media content distribution system.

Referring now to FIG. 1, an example media content distribution system 100 is shown in accordance with the present disclosure. In general, the system 100 incorporates aspects of a home computing network and a satellite-based content distribution network. For brevity, the system 100 is depicted in a simplified and conceptual form, and may generally include more or fewer systems, devices, networks, and/or other components as desired. Further, number and type of features or elements incorporated within the system 100 may or may not be implementation specific, and at least some of the aspects of the system 100 may be similar to a cable television distribution system, or other type of media distribution system. Further, the "television receiver" as described throughout may be any type of television receiver, such as a set-top-box for example. In another example, the "television receiver" may correspond to functionality integrated into a television, a digital video recorder, a tablet, or any other computing device or system, and variations thereof. Additionally, features and concepts as discussed throughout the present disclosure may be applicable to any type or form of networked computing system environment, and may not be limited to a satellite television system implementation, a cable television system implementation, or other particular implementation.

In the example non-limiting embodiment of FIG. 1, the system 100 may include a service provider 102, a satellite uplink 104, a plurality of orbiting (e.g., geosynchronous) satellites 106*a-c* (collectively, "satellites 106"), a satellite dish 108, a plurality of TRs (Television Receiver's) 110*a*-N (collectively, "TRTRs 110," where N is a non-zero integer value), a television 112, at least one server 114, and at least one database 116. The system 100 may also include an example network 118 that establishes a bi-directional communication path for data transfer between the respective elements of the system 100.

In general, the network 118 may incorporate or exhibit any number of terrestrial and/or non-terrestrial network features or elements. For example, the network 118 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, or other any type of communication network(s) configured such that data may be transferred among respective elements of the example system 100.

In the example of FIG. 1, the TR 110*a*, together with the television 112 and the network 118, may form at least a portion of a particular home computing network. The TR 110*b*, TR 110*c*, server 114, and database 116 may be separate from the particular home computing network. For example, the TR 110*b* and the TR 110*c* may each, respectively, be incorporated within a home computing network other than the particular home computing network, and the server 114 and database 116 may be incorporated within a particular server farm, providing services the TRs 110. The respective elements of the example system 100, along with the network 118, may be configured such as to enable communication(s) in accordance with any particular protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), and others.

In practice, the satellites 106 may be configured to receive uplink signals 120*a-b* (collectively, "uplink signals 120") from the satellite uplink 104. In this example, the uplink signals 120 may contain one or more transponder streams of particular data or content (e.g., a particular television channel) that is supplied by the service provider 102. For example, each of the respective uplink signals 120 may contain various encoded HD (High Definition) television channels, various SD (Standard Definition) television channels, on-demand programming, programming information, and/or any other content in the form of at least one transponder stream and in accordance with an allotted carrier frequency and bandwidth. In this example, different television channels may be carried using different ones of the satellites 106. Different television channels may also be carried using different transponders of a particular satellite (e.g., satellite 106*a*); thus, such television channels may be transmitted at different frequencies and/or different frequency ranges. For example, a first and second television channel may be carried on a first carrier frequency over a first transponder of satellite 106*a*, and a third, fourth, and fifth television channel may be carried on second carrier frequency over a first transponder of satellite 106*b*, or, the third, fourth, and fifth television channel may be carried on a second carrier frequency over a second transponder of satellite 106*a*, etc.

The satellites 106 may further be configured to relay the uplink signals 120 to the satellite dish 108 as downlink signals 122*a-b* (collectively, "downlink signals 122"). Similar to the uplink signals 120, each of the downlink signals 122 may contain one or more transponder streams of particular data or content, such as various encoded and/or electronically scrambled television channels, on-demand programming, etc., in accordance with an allotted carrier frequency and bandwidth. The downlink signals 122, however, may not necessarily contain the same content as a corresponding one of the uplink signals 120. For example, the uplink signal 120*a* may include a first transponder stream containing at least a first group of television channels, and the downlink signal 122*a* may include a second transponder stream containing at least a second, different group of television channels. In other examples, the first and second group of television channels may have one or more television channels in common. In sum, there may be varying degrees of correlation between the uplink signals 120 and the downlink signals 122, both in terms of content and underlying characteristics.

Continuing with the above simplified example, the satellite dish 108 may be provided for use (e.g., on a subscription basis) to receive television channels provided by the service provider 102, satellite uplink 104, and/or satellites 106. For example, the satellite dish 108 may be configured to receive particular transponder streams, or downlink signals (e.g., downlink signals 122), from the satellites 106. Additionally, the TR 110*a*, which is communicatively coupled to the satellite dish 108, may subsequently select via tuner (not shown), for example, and relay particular transponder streams to the television 112 for display thereon as desired. For example, the satellite dish 108 and the TR 110*a* may, respectively, be configured to receive and relay at least one premium HD-formatted television channel to the television 112. In this example, the premium HD channel may be output to the television 112 from the TR 110a in accordance with the HDMI/HDCP content protection technologies.

In example embodiments, the TR 110a may be configured to output a plurality of interfaces to the television 112. For example, as shown in FIG. 1, the TR 110a may be configured to output an EPG (Electronic Programming Guide) 124 to the television 112. The EPG 124 may at least present various information related to television channels and the timing of programs or programming appearing on such television channels (e.g., as received from satellites 106). For example, the EPG 124 may display channel information associated with a channel "2012," where a "Show S1" is listed as scheduled to appear on the channel "2012" during a particular time period "9-10 PM" of a particular day, and etc. In this example, and assuming that a "current" time is sometime during the particular time period "9-10 PM," a user may manipulate a cursor 126 using a pointing device, such as a remote control (not shown), to select (e.g., "point and click") the "Show S1" for immediate viewing on the television 112.

The EPG 124 may further present a first user-selectable icon 128 (e.g., "Set Timer" icon) that may be selected to set a recording timer to automatically record a particular program for later viewing. In this example, the TR 110a may exhibit DVR (Digital Video Recorder) functionality to record programs or programming appearing on such various channels as received from satellites 106. For example, and assuming that a "current" time is sometime prior the particular time period "9-10 PM," such as a "current" time within the time period "8-9 PM" immediately preceding the time period "9-10 PM," a user may manipulate the cursor 126 to select (e.g., "point and click") the "Show S1" for recording by the TR 110a for later viewing on the television 112. For example, following "selection" of the "Show S1," as shown by stipple shading in FIG. 1, the user may manipulate the cursor 126 to select (e.g., "point and double-click") the icon 128 to set a particular "Timer N" to automatically record the "Show S1" for later viewing. In this example, the "Timer N," where N is a non-zero integer value, is shown within a timer list 130 that may, in some embodiments, be presented within the EPG 124 (e.g., fully or at least partially superimposed over EPG 124) in response to selection of the icon 128. In general, the timer list 130 may include an inventory of all "currently" or "presently" enabled program timers, along with particular information associated with each enabled program timer including, for example, a "Content Name" parameter, a recording "Start" time parameter, a recording "Stop" time parameter, and other parameters as desired.

The EPG 124 may further present a second user-selectable icon 132 (e.g., "What's Hot" icon) that may be selected to inform a user of trends in program popularity, so that the user may keep abreast of trends as they are currently developing. For example, a user may manipulate the cursor 126 to select (e.g., "point and double-click") the icon 132 to access a trend list 134 that displays a rank or ranking of particular programs to inform the user which ones of the particular programs are "most popular" or "most watched" or "most likely to be watched." For example, the trend list 134 may indicate that "Show S1" is ranked first, ahead of integer value M−1 other forms of media content, as a program predicted to be "most popular" or "most watched" or "most likely to be watched." In this example, a TAE (Trend Analysis Engine) 136 of the TR 110a may be configured to populate the trend list 134 at least based upon all accessible scheduled program recording timers that are associated with each of the plurality of TRs 210a-N, respectively.

Figure 2:
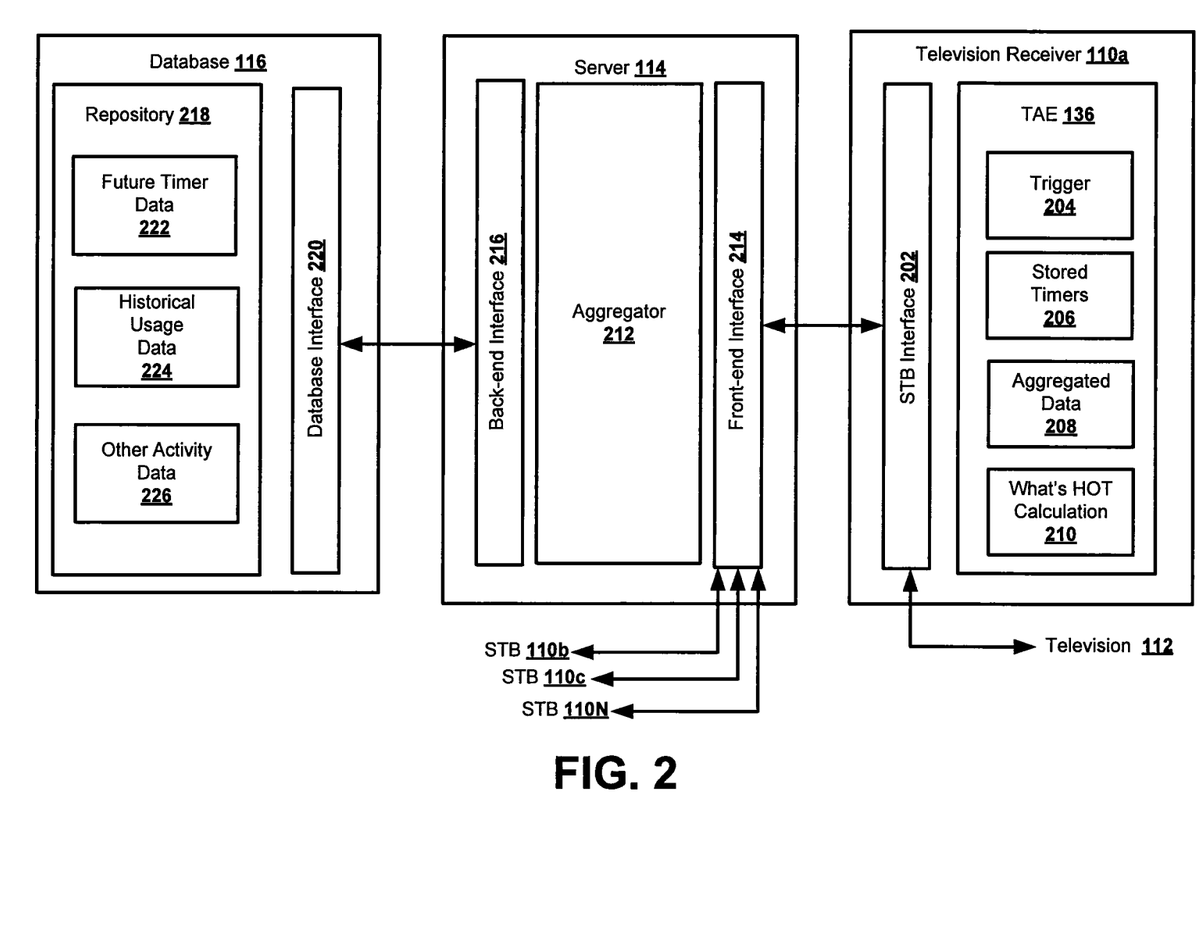
FIG. 2 shows a block diagram illustrating communications between particular components of FIG. 1.

For example, and referring now to FIG. 2, a block diagram is shown illustrating communications between particular components of FIG. 1. More specifically, a simplified, conceptual block diagram of the TR 110a, the server 114, and the database 116 is shown in FIG. 2. Also shown in FIG. 2 are connections between the server 114 and the TRs 110b-N, and between the TR 110a and the television 112. For brevity, a number of elements of the TR 110a, the server 114, and the database 116 may be omitted from the present discussion; however, at least the TR 110a, for example, may be configured to include any number of other various components or logical modules that are implemented in hardware, software, firmware, or any combination thereof, and such components or logical modules may or may not be implementation specific.

For example, the TR 110a may in certain implementations be configured to include one or more tuners, one or more network interfaces, at least one NIT (Network Information Table), one or more other DVR-related components, at least one demultiplexer, at least one smart card, at least one descrambling engine, and other various modules or components. Still other variations of the TR 110a are possible. For example, the TR 110a may include one or more logical modules configured to implement a TV steaming media functionality that encodes video into a particular format for transmission over the Internet such as to allow users to remotely view and control a home cable, satellite, or personal video recorder system from an Internet-enabled computer with a broadband Internet connection. Still other embodiments are possible.

In the present example, the TR 110 may include the trend analysis engine 136 (as shown in FIG. 1) and a TR interface 202. The trend analysis engine 136 may include a trigger module 204, a stored timers module 206, an aggregated data module 208, and a calculation module 210. The server 114 may include an aggregator module 212, a front-end interface 214, and a back-end interface 216, and the database 116 may include a repository 218 and a database interface 220. The repository 218 may include a future timer module 222, a historical usage module 224, and an "other" activity data module 226. Other embodiments are possible as well. For example, in some embodiments, one or more respective components of the trend analysis engine 136, or the trend analysis engine 136 itself, may be wholly or at least partially located on the server 114. Still other embodiments are possible.

In practice, the aggregator 212 may periodically or at least intermittently receive, from each of the plurality of TRs 110a-N, information associated with scheduled program recording timers. For example, the trigger module 204 of the TR 110a may periodically or at least intermittently activate the trend analysis engine 136 to "push," to the aggregator 212, data associated with all "currently" or "presently" enabled program timers as contained within the stored timers module 206. In this example, the aggregator 212 may aggregate and store information associated with received scheduled program recording timers within the future timer module 222 of the database 116.

For example, and assuming for simplicity the each of the plurality of TRs 110a-N include a timer similar to the particular "Timer N" as shown in FIG. 1, the aggregator 212 may receive and aggregate information associated with the "Timer N," including at least keeping a running tally "N; Show S1," indicating that the aggregator 212 has presently identified integer "N" number of timers associated with the "Show S1" (i.e., a single program timer for each one of the TRs 110a-N). Here, the aggregator 212 may periodically or at least intermittently access the future timer module 222, and combine the running tally "N; Show S1" with existing information associated with the "Show S1" within the future timer module 222. For example, assuming that the future timer module 222 includes an entry "5; Show S1," indicating that the future timer module 222 has presently identified or has knowledge of integer "5" number of timers associated with the "Show S1," the aggregator 212 may append the entry as "N+5; Show S1" within the future timer module 222 to reflect that there are currently an integer "N+5" number of timers associated with the "Show S1," and so on.

In one embodiment, the entry associated with the "Show S1" may persist and be updated periodically or at least intermittently within the future timer module 222 until the "Show S1" has been broadcast for viewing. For example, referring additionally to the EPG 124 as shown in FIG. 1, and assuming no additional timers have been discovered by the aggregator 212, following broadcast of the "Show S1" on the channel "2012" during the particular time period "9-10 PM," the entry "N+5; Show S1" may be designated as "historical information" and transferred by the aggregator 212 from the future timer module 222 to the historical usage module 224 within the database 116. In general, at least information stored within one or both of the future timer module 222 and the historical usage module 224 may be used by the trend analysis engine 136 to generate the trend list 134, which displays a rank or ranking of particular programs to inform the user which ones of the particular programs are predicted to be "most popular" or "most watched" or "most likely to be watched," as discussed above in connection with FIG. 1.

For example, the aggregator 212 may periodically or at least intermittently transmit, to each of the plurality of TRs 110a-N, information stored within at least one of the future timer module 222, the historical usage module 224, and the activity data module 226. For example, the trigger module 204 of the TR 110a may periodically or at least intermittently activate the trend analysis engine 136 to instruct the aggregator 212 to "pull" data stored within at least one of the future timer module 222, the historical usage module 224, and the activity data module 226, and return the same to the TR 110a. Such information may be stored within the aggregated data module 208 as "module-specific" data files. For example, a first data file stored within the aggregated data module 208 may include a particular "future timer" data file as retrieved from the future timer module 222, a second data file stored within the aggregated data module 208 may include a particular "historical usage" data file as retrieved from the historical usage module 224, and a third data file stored within the aggregated data module 208 may include a particular "other activity" data file as retrieved from the activity data module 226. Subsequently, the trigger module 204 may receive a command corresponding to selection of the icon 132, which may instruct the trend analysis engine 136 to activate the calculation module 210 to access data as contained within the aggregated data module 208, and generate the trend list 134 as shown in FIG. 1. In example embodiments, however, and referring now to FIG. 3, information as itemized within the trend list 134 may be presented in accordance with user-preference.

Figure 3:
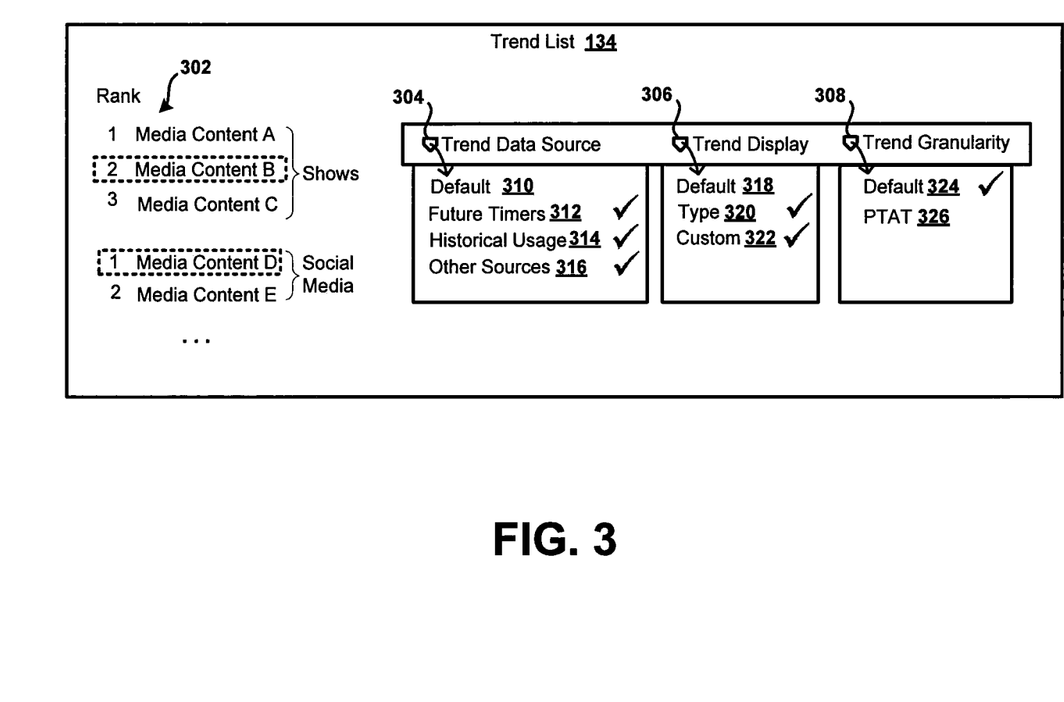
FIG. 3 shows an example trend list that presents ranked media content in accordance with user-preference.

In particular, the trend list 134 as shown in FIG. 3 presents ranked media content in accordance with user-preference, as desired. For example, the trend list 134 may include a rank section 302, a first pick-list 304, a second pick-list 306, and a third pick list 308. In general, information as itemized or otherwise presented within the rank section 302 may be presented in accordance with selections made by a particular user within the respective pick-lists 304, 306, 308. However, other embodiments are possible. For example, the trend list 134 as shown in FIG. 3 may be configured to exhibit any type of user interface control element(s) to enable the presentation of ranked or otherwise itemized media content in accordance with user-preference.

For example, the first pick-list 304 may enable a user to select trend source data for the rank section 302, and includes a default selection 310, a future timers selection 312, a historical usage selection 314, and an "other" sources selection 316. In the present example, the default selection 310 when selected within the first pick-list 304, or the future timers selection 312 when solely selected, may control the trend analysis engine 136 to generate the trend list 134, via activation of the calculation module 210 as described above, only in accordance with a particular "future timer" data file as stored within the aggregated data module 208. In contrast, the historical usage selection 314 when solely selected within the first pick-list 304, or the sources selection 316 when solely selected, may control the trend analysis engine 136 to generate the trend list 134 only in accordance with one of the particular "historical usage" data file and the particular "other activity" data file as stored within the aggregated data module 208. In the example of FIG. 3, the future timers selection 312, historical usage selection 314, and sources selection 316 are shown as selected. In this scenario, the trend analysis engine 136 may generate the trend list 134 in accordance with the particular "future timer" data file, the particular "historical usage" data file, and the particular "other activity" data file as stored within the aggregated data module 208. However, other embodiments are possible. For example, in some embodiments, only the future timers selection 312 and the historical usage selection 314 may be selected, and etc.

The second pick-list 306 may enable a user to select a display type for the rank section 302, and may include a default selection 318, a type selection 320, and a custom selection 322. In the present example, the default selection 310 when selected within the second pick-list 306 may control the trend analysis engine 136 to generate the trend list 134 in a manner as shown in FIG. 1. In particular, the default selection 310 when selected within the second pick-list 306 may control the trend analysis engine 136 to generate the trend list 134 to present a ranked list of media content, without consideration of type of media content. In contrast, the type selection 320 when solely selected within the second pick-list 306 may control the trend analysis engine 136 to generate the trend list 134 in accordance with a type of media content.

For example, as shown within the rank section 302 in FIG. 3, the trend list 134 may indicate that "Media Content A" is ranked first, ahead of "Media Content B" and "Media Content C," as media content predicted to be "most popular" or "most watched" or "most likely to be watched" of media content type "Shows." Similarly, the trend list 134 may indicate that "Media Content D" is ranked first, ahead of "Media Content E," as media content predicted to be "most popular" or "most watched, observed, or accessed" or "most likely to be watched, observed, or accessed" of media content type "Social Media." In this example, "Media Content D" and "Media Content E" may be identified within the particular "other activity" data file as stored within the aggregated data module 208, as described above. In this manner, the activity data module 226 as shown in FIG. 2 may house, at least in this instance, information that may be designated as "social media information." However, other embodiments are possible. For example, the activity data module 226 may generally house any media-related information as desired (e.g., advertising media, broadcast media, social media, news media, etc.), and may or may not be implementation specific. Still other embodiments are possible. For example, the activity data module 226 may generally house any information associated with a particular type of discoverable electronic document (e.g., word processing document, email documents, etc.).

As mentioned above, the second pick-list 306 may further include a custom selection 322. In one embodiment, the custom selection 322 when selected within the second pick-list 306 may control the trend analysis engine 136 to generate the trend list 134 in a manner as shown in FIG. 1, although restricted to a particular "time period" such as, for example, by restricting "future" timer information to "two weeks" in the future. In this example, program timers scheduled to record a particular program greater than two weeks from a "present" date time may not be presented, or counted, within the trend list 134. In another example, the custom selection 322 when selected within the second pick-list 306 may control the trend analysis engine 136 to generate the trend list 134 in accordance with a combination of time restrictions such as, for example, by restricting "future" timer information to "2 weeks" in the future and "historical usage" information to "1 week" in the past. In these examples, although not explicitly shown, a "custom interface" may be presented within the EPG 124 (e.g., fully or at least partially superimposed over EPG 124) in response to selection of the custom selection 322 such that a particular user may define one or more time/timer restrictions via the custom selection 322. Other embodiments are possible.

For example, in one embodiment, the custom selection 322 when selected within the second pick-list 306 may control the trend analysis engine 136 to generate the trend list 134 in accordance with user-defined criteria. For example, the particular "future timer" data file, the particular "historical usage" data file, and the particular "other activity" data file as stored within the aggregated data module 208 may include any conceivable type of observable information that may be attached to certain media content (e.g., as metadata). For example, in response to selection of the custom selection 322, a particular user may define a particular display criteria that interests the user. For example, the particular user may define as particular display criteria "Peyton Manning," since the particular user may be a fan of the football player "Peyton Manning." In this example, the custom selection 322 when selected within the second pick-list 306, along with the type selection 320, may control the trend analysis engine 136 to generate the trend list 134 in a manner as shown in FIG. 3, where while separately itemized based on media "type," based on engagement of the type selection 320, the "Media Content B" and "Media Content D" may be "highlighted" (e.g., as shown by intermittent lines in FIG. 3) within the rank section 302 as both may include data (or metadata) identifying "Peyton Manning" as being associated with the "Media Content B" and "Media Content D." Still other embodiments are possible.

As mentioned above, the trend list 134 may further include a third pick-list 308. The third pick-list 308 may enable a user to select a "granularity" for trend data as displayed within the rank section 302, and may include a default selection 324, and a PTAT (Prime Time Any Time) selection 326. In the present example, the default selection 324 when selected within the third pick-list 308 may control the trend analysis engine 136 to generate the trend list 134 in a manner as shown in FIG. 1, and as shown in FIG. 3. In particular, the default selection 310 when selected within the third pick-list 308 may control the trend analysis engine 136 to generate the trend list 134 to present a ranked list of individual instances of media content (e.g., "Media Content A," and "Media Content B," and etc.). The PTAT selection 326 when selected within the third pick-list 308, however, may control the trend analysis engine 136 to generate the trend list 134 to present a ranked list of grouped instances of media content.

For example, in one embodiment, the TR 110a may be configured to record (e.g., by scheduled recording timer) a particular predefined block of "prime-time" television that may include multiple "Shows" over a predetermined period of time (e.g., 7 PM to 10 PM). In this example, the PTAT selection 326 when selected within the third pick-list 308 may control the trend analysis engine 136 to generate the trend list 134 to present a ranked list of grouped instances of "prime time any time" media content (not shown), excluding individual instances of media content. In certain instances, the default selection 324 and the PTAT selection 326 may be selected so as to control the trend analysis engine 136 to generate the trend list 134 to present a ranked list of grouped instances of media content, in tandem with a ranked list of grouped instances of media content, without distinction made between the two instances of grouping (e.g., singular and multiple). For example, "Media Content A" may correspond to a single "Show," whereas "Media Content B" may correspond to a plurality of "Shows" that are scheduled to appear within a particular timeframe "7 PM to 10 PM" on a particular day "Thursday." Other embodiments are possible as well.

Figure 4:
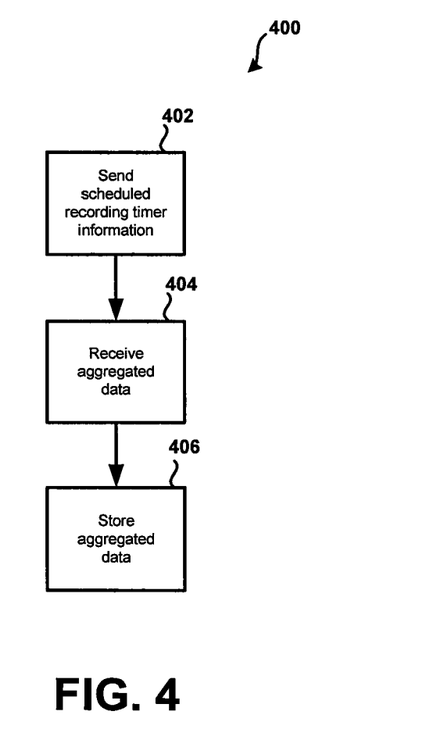
FIG. 4 shows a flowchart for an example method for acquiring a set of aggregated data in accordance with the principles of the present disclosure.

Referring now to FIG. 4, an example method 400 for acquiring a set of aggregated data is shown in accordance with the principles of the present disclosure. In particular, the aggregated data may be used for predicting user-interest in particular media content based on user-activity that is associated with the particular media content. In general, the method 400 may be implemented by any one of the TRs 110a-N, as described above in connection with FIGS. 1-3. However, other embodiments are possible. For example, one or more modules of the example method 400 may be implemented by one or more of the other respective devices or components within the example system 100 as described above. Still other embodiments are possible.

The example method 400 may include sending (module 402), by the TR 110a to the server 114, data associated with all "currently" or "presently" enabled program timers as contained within the stored timers module 206 that is associated with the TR 110a. In general, the data associated with all "currently" or "presently" enabled program timers may be sent from the TR 110a to the server 114 periodically or at least intermittently. An example of a periodic "push" of data associated with enabled program timers from the TR 110a to the server 114 may include a nightly (e.g., 12:05 AM) automated transfer of data from the TR 110a to the server 114. An example of an intermittent "push" of data associated with enabled program timers from the TR 110a to the server 114 may include an automated transfer of data from the TR 110a to the server 114 following the setting of a particular recording timer. For example, once the particular "Timer N" to automatically record the "Show S1" for later viewing is enabled, as discussed above in connection with FIG. 1, the TR 110a may immediately or approximately immediately "push" particular information associated with the enabled program "Timer N" to the server 114 including, for example, the associated "Content Name" parameter, recording "Start" time parameter, recording "Stop" time parameter, and other parameters as desired. Other embodiments are possible.

The example method 400 may further include receiving (module 404), by the TR 110a from the server 114, information stored within at least one of the future timer module 222, the historical usage module 224, and the activity data module 226 as stored within the repository 218 of the database 116, as discussed above in connection with FIG. 2. In general, information stored within at least one of the future timer module 222, the historical usage module 224, and the activity data module 226 may be retrieved from the server 114 by the TR 110a periodically or at least intermittently. An example of a periodic "pull" of such information or data may be in response to an instruction issued on a nightly (e.g., 12:06 AM) basis by the trigger module 204 to activate the trend analysis engine 136 to instruct the aggregator 212 to pull data stored within at least one of the future timer module 222, the historical usage module 224, and the activity data module 226, and return the same to the TR 110a. An example of an intermittent "pull" of such information or data may be in response to a manual user-instruction (e.g., via user interaction with a pointing device, such as a remote control) to engage the trigger module 204 to activate the trend analysis engine 136 to instruct the aggregator 212 to pull data stored within at least one of the future timer module 222, the historical usage module 224, and the activity data module 226, and return the same to the TR 110a. Still other embodiments are possible.

The example method 400 may further include storing (module 406), by the TR 110a and within the aggregated data module 208 of the TR 110a, at least one "module-specific" data file as received from the server 114. For example, the TR 110a may store a first particular data file type within the aggregated data module 208 including a particular "future timer" data file as retrieved from the future timer module 222 of the repository 218. In another example, the TR 110a may store a second particular data file type within the aggregated data module 208 including a particular "historical usage" data file as retrieved from the historical usage module 224 of the repository 218. In yet another example, the TR 110a may store a third particular data file type within the aggregated data module 208 including a particular "other activity" data file as retrieved from the activity data module 226 of the repository 218. Other embodiments are however possible. For example, in some embodiments, information stored within at least one of the future timer module 222, the historical usage module 224, and the activity data module 226 as stored within the repository 218 of the database 116 and received by the TR 110a from the server 114 may be received as a "single" data file (e.g., binary large object file). Still other embodiments are possible.

Figure 5:
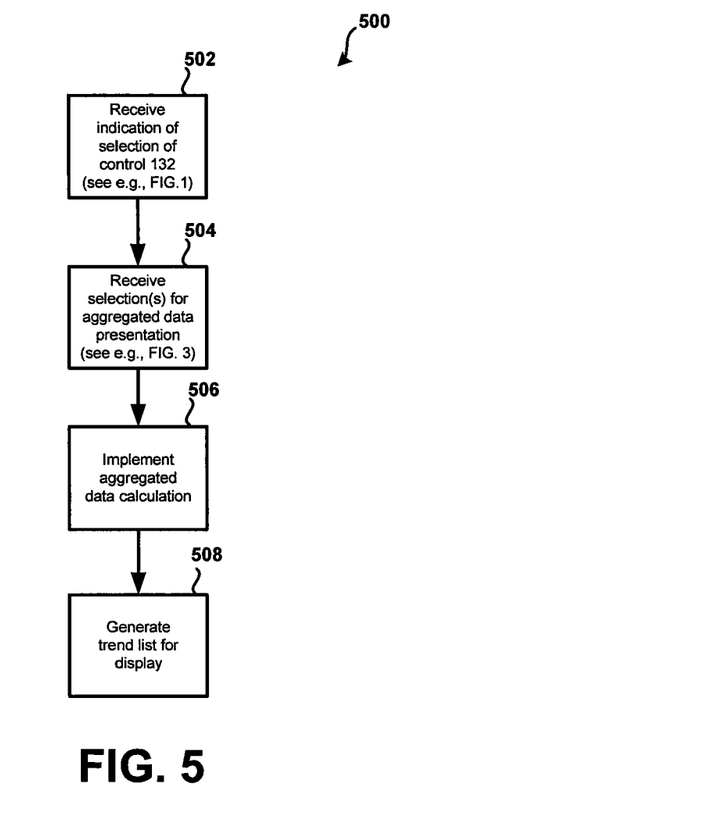
FIG. 5 shows a flowchart for an example method for generating a trend list in accordance with the principles of the present disclosure.

Referring now to FIG. 5, an example method 500 for generating a trend list is shown in accordance with the principles of the present disclosure. In particular, the trend list (e.g., trend list 134) may be generated based at least upon user-preference(s), and also "future" information, such as to enable consumers to keep up with latest trends as they are currently developing. In general, the method 500 may be implemented by any one of the TRs 110a-N, as described above in connection with FIGS. 1-4. However, other embodiments are possible. For example, one or more modules of the example method 500 may be implemented by one or more of the other respective devices or components within the example system 100 as described above. Still other embodiments are possible.

The example method 500 may include receiving (module 502), by the TR 110a, indication of user-selection of the icon 132, as shown in FIG. 1. As discussed above, a particular user may manipulate the cursor 126 to select the icon 132 to access the trend list 134 of FIG. 1, and FIG. 3, which displays a rank or ranking of particular media content such that the particular user may be informed which ones of particular media content are predicted to be "most popular" or "most watched, observed, or accessed" or "most likely to be watched, observed, or accessed."

The example method 500 may further include receiving (module 504), by the TR 110a, user-selection of one or more items within one or more of the first pick-list 304, the second pick-list 306, and the third pick list 308 within the example trend list 134 of FIG. 3. As discussed above, information as itemized or otherwise presented within the rank section 302 of the trend list 134 may be presented in accordance with selections made by a particular user within the respective pick-lists 304, 306, 308.

The example method 500 may further include implementing (module 508), by the TR 110a, a calculation algorithm based upon user-selection of the one or more items (see module 506) within one or more of the first pick-list 304, the second pick-list 306, and the third pick list 308. For example, the calculation module 210 of the TR 110a may access one or more of the particular "future timer" data file, the particular "historical usage" data file, and the particular "other activity" data file, as stored within the aggregated data module 208, and generate an associated rank or ranking parameter for each one of the "Media Content A," "Media Content B," "Media Content C," "Media Content D," and "Media Content E" as shown within the rank section 302 of the trend list 134. In some example, additional analytics may be applied to generate a rank or ranking of the respective media content of FIG. 3.

For example, when at least the future timers selection 312 and the historical usage selection 314 of the first pick-list 304 are selected, the calculation module 210 of the TR 110a may implement an "averaging" function. For example, in one embodiment, the calculation module 210 may access information within the particular "future timer" data file associated with particular media content, and also access information within the particular "historical usage" data file associated with the particular media content, and take an "average" of the two data points to predict or otherwise quantity a likelihood that the particular media content may be "watched, observed, or accessed" in the future.

For example, the particular "future timer" data file as stored within the aggregated data module 208 may indicate that the "Media Content A" of FIG. 3 has an integer "6" number of scheduled timers associated with the same. In this example, the integer "6" number of scheduled timers are "future" timers in that the "Media Content A" is scheduled to be recorded, such as on a particular Monday, during a particular time period "9-10 PM," for later viewing. Further, the particular "historical usage" data file as stored within the aggregated data module 208 may indicate that the "Media Content A" has an integer "10" number of timers associated with the same. In this example, the integer "10" number of scheduled timers are "past" timers in that the "Media Content A" was previously recorded, such as on a Monday preceding the particular Monday, during the particular time period "9-10 PM." An average of the two respective data points may correspond to an integer "8" number of timers associated with the "Media Content A." In this example, and assuming that the "Media Content B" and the "Media Content C" exhibit an integer "X" number of timers each less than the integer "8" number of timers associated with the "Media Content A, the "Media Content A" may be ranked ahead of "Media Content B" and "Media Content C" as media content predicted to be "most popular" or "most watched" or "most likely to be watched" of media content type "Shows."

In another example, when at least the historical usage selection 314 is selected, the calculation module 210 of the TR 110a may implement a "weighting" function. For example, in one embodiment, the calculation module 210 may access information within the particular "historical usage" data file associated with particular media content, and determine "how long" that the particular media content has been viewed (e.g., % viewed), on a timer-by-timer basis, following recording and "later viewing" of the particular media content. Similar to the "averaging" function, the "weighting" function may be used to predict or otherwise quantity a likelihood that the particular media content may be "watched, observed, or accessed" in the future.

For example, the particular "historical usage" data file as stored within the aggregated data module 208 may indicate that the "Media Content A" has been viewed to at least 85% completion for each of an integer "10" number of timers associated with the same. In this example, each of the integer "10" number of timers may be associated with a weighting of integer "1," indicating a very strong likelihood that the "Media Content A" was a popular choice with the consumers who recorded the "Media Content A," because a majority (e.g., at least 85%) of the "Media Content A" was "watched, observed, or accessed." Here, a "final" value of integer "10" may be assigned to the "Media Content A," and ranking of the "Media Content A" with respect to "Media Content B" and "Media Content C" may subsequently be implemented by the TR 110a at least based on the "final" value of integer "10."

In a different example, the particular "historical usage" data file as stored within the aggregated data module 208 may indicate that the "Media Content A" has been viewed to at least 85% completion for each of a first integer "6" number of timers associated with the same, and has been viewed to less than 15% completion for each of a second integer "5" number of other timers associated with the same. In this example, each of the first integer "6" number of timers may be associated with a weighting of integer "1," whereas each of the second integer "5" number of timers may be associated with a weighting of integer "0." Here, a "final" value of integer "6" may be assigned to the "Media Content A," and ranking of the "Media Content A" with respect to "Media Content B" and "Media Content C" may subsequently be implemented by the TR 110a at least based on the "final" value of integer "6."

In the example of the "weighting" function, any particular weighting value may be assigned to any particular range of % completion of the "Media Content A" as desired. For example, in one embodiment, about 0% completion to about 10% completion may be assigned a weighting value of integer "0," about 11% completion to about 75% completion may be assigned a weighting value of integer "0.5," and about 76% completion to about 100% completion may be assigned a weighting value of integer "1." Additionally, the "weighting" function and the above described "averaging" may be combined to predict or otherwise quantity a likelihood that the particular media content may be "watched, observed, or accessed" in the future.

For example, assuming a "final" value of integer "6" is assigned to the "Media Content A" based on the "weighting" function, and that the particular "future timer" data file as stored within the aggregated data module 208 indicates that the "Media Content A" has an integer "6" number of scheduled timers associated with the same (as described above), an average of the two respective data points may correspond to an integer "8" number of timers associated with the "Media Content A." In this example, and assuming that the "Media Content B" and the "Media Content C" exhibit an integer "X" number of timers each less than the integer "8" number of timers associated with the "Media Content A, the "Media Content A" may be ranked ahead of "Media Content B" and "Media Content C" as media content predicted to be "most popular" or "most watched" or "most likely to be watched" of media content type "Shows."

The example method 500 may further include generating (module 510), by the TR 110a, the rank section 302 for display within the trend list 134 of FIG. 3. In this manner, the TR 110a may generate the set of aggregated data based at least upon user-preference and also "future" information, such as to enable consumers to keep up with latest trends as they are currently developing.

Figure 6:
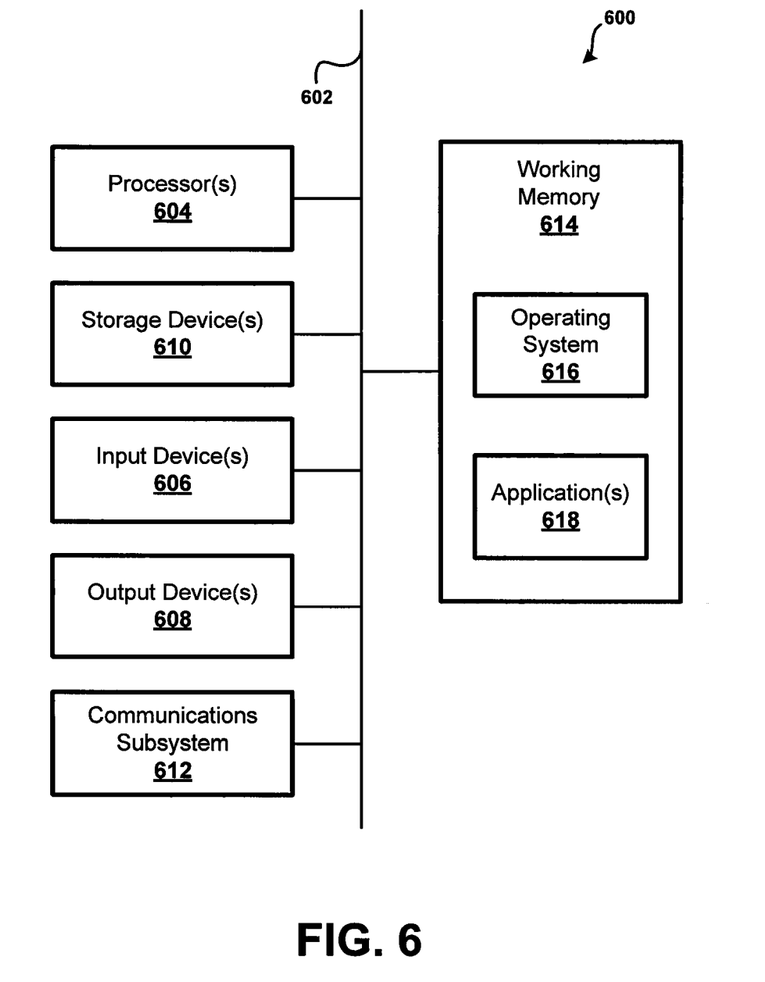
FIG. 6 shows an example computing system or device.

Referring now to FIG. 6, an embodiment of an example computer system or device 600 is shown. An example of a computer system or device includes an enterprise server, blade server, desktop computer, laptop computer, personal data assistant, smartphone, gaming console, set-top-box, and any other type machine for performing calculations. The computer system 600 may be wholly or at least partially incorporated as part of previously-described computing devices, such as the plurality of TRs 110, television 112, server 114, and database 116 of FIG. 1. The example computer device 600 may be configured to perform and/or include instructions that, when executed, cause the computer system 600 to perform the method of FIGS. 4 and 5. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer device 600 is shown comprising hardware elements that can be electrically coupled via a bus 602 (or may otherwise be in communication, as appropriate). The hardware elements may include a processing unit with one or more processors 604, including without limitation one or more general-purpose processors and/or one or more special-purpose processors (such as digital signal processing chips, graphics acceleration processors, and/or the like); one or more input devices 606, which can include without limitation a remote control, a mouse, a keyboard, and/or the like; and one or more output devices 608, which can include without limitation a presentation device (e.g., television), a printer, and/or the like.

The computer system 600 may further include (and/or be in communication with) one or more non-transitory storage devices 610, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer device 600 might also include a communications subsystem 612, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 612 may permit data to be exchanged with a network (such as the network described below, to name one example), other computer systems, and/or any other devices described herein. In many embodiments, the computer system 600 will further comprise a working memory 614, which can include a RAM or ROM device, as described above.

The computer device 600 also can comprise software elements, shown as being currently located within the working memory 614, including an operating system 616, device drivers, executable libraries, and/or other code, such as one or more application programs 618, which may comprise computer programs provided by various embodiments, and/or may be designed to implement methods, and/or configure systems, provided by other embodiments, as described herein. Merely by way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 610 described above. In some cases, the storage medium might be incorporated within a computer system, such as computer system 600. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 600) to perform methods in accordance with various embodiments of the invention. According to a set of embodiments, some or all of the procedures of such methods are performed by the computer system 600 in response to processor 604 executing one or more sequences of one or more instructions (which might be incorporated into the operating system 616 and/or other code, such as an application program 618) contained in the working memory 614. Such instructions may be read into the working memory 614 from another computer-readable medium, such as one or more of the storage device(s) 610. Merely by way of example, execution of the sequences of instructions contained in the working memory 614 may cause the processor(s) 604 to perform one or more procedures of the methods described herein.

The terms "machine-readable medium" and "computer-readable medium," as used herein, refer to any medium that participates in providing data that causes a machine to operate in a specific fashion. In an embodiment implemented using the computer device 600, various computer-readable media might be involved in providing instructions/code to processor(s) 604 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 610. Volatile media include, without limitation, dynamic memory, such as the working memory 614.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 604 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 612 (and/or components thereof) generally will receive signals, and the bus 602 then might carry the signals (and/or the data, instructions, etc. carried by the signals) to the working memory 614, from which the processor(s) 604 retrieves and executes the instructions. The instructions received by the working memory 614 may optionally be stored on a non-transitory storage device 610 either before or after execution by the processor(s) 604.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for predicting user-interest in particular media content, comprising:
    accumulating, by a computer system, data associated with scheduled program recording timers across accessible subscribing customers of a particular television provider;
    assigning, by the computer system, a ranking value to particular programs associated with particular ones of the scheduled program recording timers; and
    outputting, by the computer system, a list itemizing particular programs according to assigned ranking values for presentation to at least one user of the particular television provider when user-defined criteria identified by the computer system indicates a user-specific preference to include within the list program ranking based on program recording timers, and exclude from the list media content ranking based on other different usage data unrelated to programs.

2. The method of claim 1, further comprising accumulating data associated with scheduled program recording timers in response to a periodic activation trigger.

3. The method of claim 1, further comprising accumulating data associated with scheduled program recording timers in response to a user-initiated activation trigger.

4. The method of claim 1, further comprising assigning the ranking parameter to particular programs based upon a number of particular ones of the scheduled program recording timers.

5. The method of claim 4, further comprising accumulating data associated with expired program recording timers across accessible subscribing customers of the particular television provider.

6. The method of claim 5, further comprising assigning the ranking parameter to particular programs based upon a number of particular ones of the expired program recording timers.

7. The method of claim 6, further comprising assigning the ranking parameter to particular programs based upon an average value of the number of particular ones of the expired program recording timers and the number of particular ones of the scheduled program recording timers.

8. The method of claim 6, further comprising assigning the ranking parameter to particular programs based upon an weighted value of the number of particular ones of the expired program recording timers, and the number of particular ones of the scheduled program recording timers.

9. A television receiver, comprising:
    a first module configured to at least receive data associated with scheduled program recording timers across accessible subscribing customers of a particular television provider;
    a second module configured to calculate and assign a ranking value to particular programs associated with particular ones of the scheduled program recording timers; and
    a third module configured to identify a user-defined preference to include within a list program ranking based on program recording timers, and exclude from the list media content ranking based on usage data unrelated to programs and program recording timers, and generate the list itemizing particular programs based on program recording timers and assigned ranking values.

10. The television receiver of claim 9, wherein the first module is further configured to generate a periodic activation trigger, and send a request to a particular computing system to receive data associated with scheduled program recording timers in response to the periodic activation trigger.

11. The television receiver of claim 9, wherein the first module is further configured to send a request to a particular computing system to receive data associated with scheduled program recording timers in response to an intermittent activation trigger.

12. The television receiver of claim 9, wherein the second module is further configured to identify numbers of particular scheduled program recording timers, and assign the ranking parameter to particular programs based upon a number of particular ones of the scheduled program recording timers.

13. The television receiver of claim 9, wherein the first module is further configured to receive and aggregate data associated with expired program recording timers across accessible subscribing customers of the particular television provider.

14. The television receiver of claim 13, wherein the second module is further configured to identify numbers of particular expired program recording timers, and assign the ranking parameter to particular programs based upon a number of particular ones of the expired program recording timers.

15. The television receiver of claim 14, wherein the second module is further configured to calculate an average value of the number of particular ones of the expired program recording timers and the number of particular ones of the scheduled program recording timers, and assign the ranking parameter to particular programs based upon the average value.

16. The television receiver of claim 14, wherein the second module is further configured to calculate a weighted value of the number of particular ones of the expired program recording timers, and the number of particular ones of the scheduled program recording timers, and assign the ranking parameter to particular programs based upon the weighted value.

17. A computing device, comprising: a processing unit; and a system memory connected to the processing unit, the system memory including instructions that, when executed by the processing unit, cause the processing unit to implement at least one module configured to:
    accumulate data associated with scheduled broadcast program recording timers and expired broadcast program recording timers across accessible subscribing customers of a particular television provider;
    assign a ranking value to particular broadcast programs associated with particular ones of the scheduled and expired broadcast program recording timers;
    detect user-defined criteria that indicates a user-specific preference to include within a list program ranking based on program recording timers, and exclude from the list media content ranking based on different usage data selected from advertising media, social media, and news media; and
    output for display by a presentation device the list itemizing particular programs associated with particular ones of the scheduled and expired program timers according to assigned ranking values.

18. The computing device of claim 17, wherein the least one module is further configured to detect modification of the user-defined criteria that indicates the user-specific preference to include within the list media content ranking based on at least one of advertising media, social media, and news media.

19. The computing device of claim 18, wherein the least one module is further configured to:
- accumulate data associated with the at least one of advertising media, social media, and news media;
- assign a ranking value to particular media content associated with the at least one of advertising media, social media, and news media; and
- output for display by the presentation device the list itemizing particular programs associated with particular ones of the scheduled and expired program timers according to assigned ranking values and itemizing separately particular media content according to assigned ranking values.

* * * * *